United States Patent
Taguchi

(10) Patent No.: US 9,576,748 B2
(45) Date of Patent: Feb. 21, 2017

(54) ELECTRICITY STORAGE DEVICE AND METHOD FOR MANUFACTURING SAME

(71) Applicant: NIPPON CHEMI-CON CORPORATION, Tokyo (JP)

(72) Inventor: Junnosuke Taguchi, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 68 days.

(21) Appl. No.: 14/709,771

(22) Filed: May 12, 2015

(65) Prior Publication Data

US 2015/0243453 A1    Aug. 27, 2015

Related U.S. Application Data

(63) Continuation of application No. PCT/JP2013/006907, filed on Nov. 25, 2013.

(30) Foreign Application Priority Data

Nov. 26, 2012    (JP) .................................. 2012-257360
Nov. 26, 2012    (JP) .................................. 2012-257361

(51) Int. Cl.
*H01G 11/86*    (2013.01)
*H01G 9/048*    (2006.01)
(Continued)

(52) U.S. Cl.
CPC .............. *H01G 11/86* (2013.01); *H01G 9/008* (2013.01); *H01G 9/0029* (2013.01); *H01G 9/02* (2013.01);
(Continued)

(58) Field of Classification Search
CPC ......... H01G 11/24; H01G 11/26; H01G 11/86; H01G 11/66; H01G 9/048; H01G 11/28; H01G 11/30; H01G 11/58; H01G 9/0029; H01G 9/145; H01G 11/22; H01G 13/02; H01G 9/00; H01G 9/008; H01G 9/045

See application file for complete search history.

(56) References Cited

U.S. PATENT DOCUMENTS

| | | | | |
|---|---|---|---|---|
| 6,456,484 B1* | 9/2002 | Matsuoka | ................ | H01G 9/06 361/502 |
| 6,896,993 B2* | 5/2005 | Hozumi | ................... | H01G 4/32 361/502 |

(Continued)

FOREIGN PATENT DOCUMENTS

| | | |
|---|---|---|
| JP | 10-275610 A | 10/1998 |
| JP | 2009-289672 A | 12/2009 |
| JP | 2010-080392 A | 4/2010 |

OTHER PUBLICATIONS

Office Action dated Nov. 1, 2016, issued in counterpart Japanese Patent Application No. 2012-257360, with English translation. (5 pages).

(Continued)

*Primary Examiner* — Dion R Ferguson

(74) *Attorney, Agent, or Firm* — Westerman, Hattori, Daniels & Adrian, LLP

(57) ABSTRACT

An electricity storage device includes an electricity storage element formed by winding an electrode body of an anode or cathode side along with a separator, an electrode leading section having an inclined edge is formed on an element end-face of the electricity storage element by a part of the electrode body.

9 Claims, 15 Drawing Sheets

(51) Int. Cl.
| | |
|---|---|
| *H01G 11/70* | (2013.01) |
| *H01G 11/74* | (2013.01) |
| *H01G 11/84* | (2013.01) |
| *H01G 9/008* | (2006.01) |
| *H01M 2/22* | (2006.01) |
| *H01M 2/26* | (2006.01) |
| *H01M 4/70* | (2006.01) |
| *H01M 10/04* | (2006.01) |
| *H01M 10/0587* | (2010.01) |
| *H01G 9/00* | (2006.01) |
| *H01G 9/02* | (2006.01) |
| *H01G 11/12* | (2013.01) |
| *H01G 11/26* | (2013.01) |
| *H01G 11/52* | (2013.01) |
| *H01M 10/052* | (2010.01) |
| *H01M 12/00* | (2006.01) |

(52) U.S. Cl.
CPC .............. *H01G 9/048* (2013.01); *H01G 11/12* (2013.01); *H01G 11/26* (2013.01); *H01G 11/52* (2013.01); *H01G 11/70* (2013.01); *H01G 11/74* (2013.01); *H01G 11/84* (2013.01); *H01M 2/22* (2013.01); *H01M 2/263* (2013.01); *H01M 4/70* (2013.01); *H01M 10/0431* (2013.01); *H01M 10/0587* (2013.01); *H01G 2009/0007* (2013.01); *H01M 10/052* (2013.01); *H01M 12/005* (2013.01); *Y02E 60/13* (2013.01); *Y10T 29/417* (2015.01)

(56) References Cited

U.S. PATENT DOCUMENTS

2009/0185326 A1* 7/2009 Kato ...................... H01G 4/015
361/301.4
2013/0155575 A1* 6/2013 Mori ...................... H01G 9/008
361/500

OTHER PUBLICATIONS

Office Action dated Nov. 1, 2016, issued in counterpart Japanese Patent Application No. 2012-257361, with English translation. (6 pages).

* cited by examiner

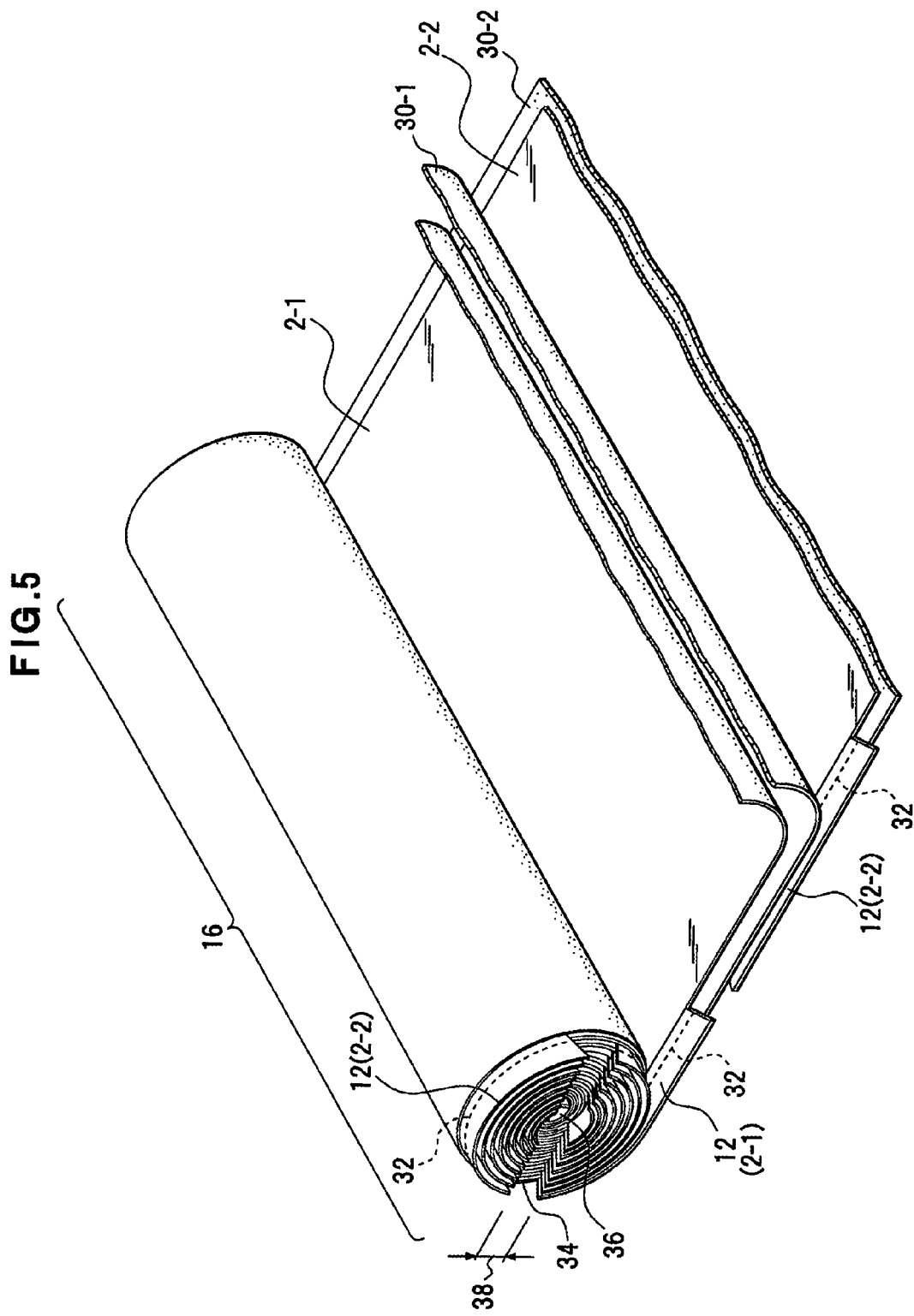

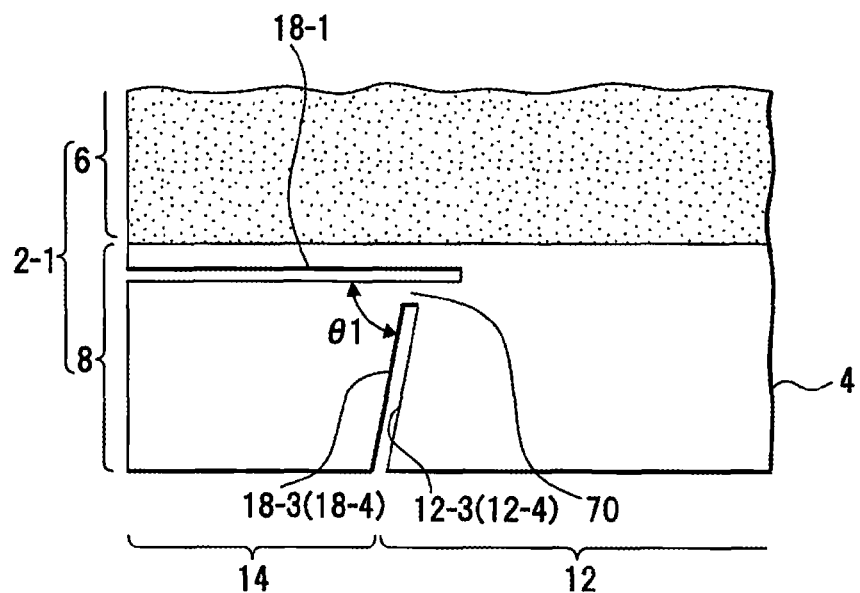
FIG.9A
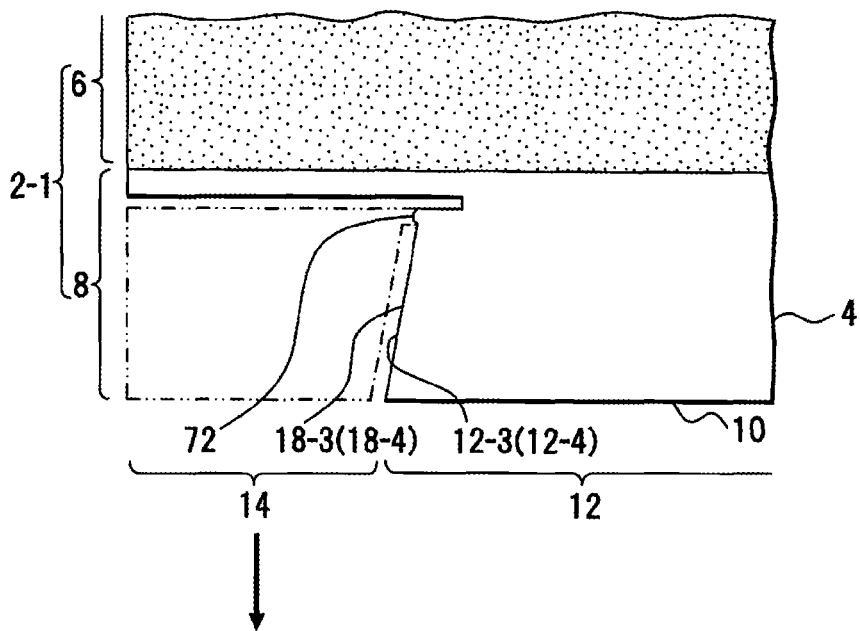
FIG.9B
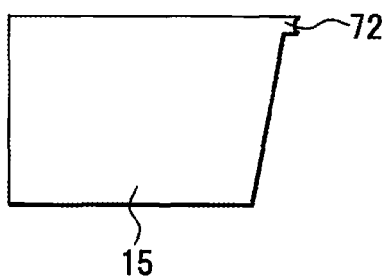

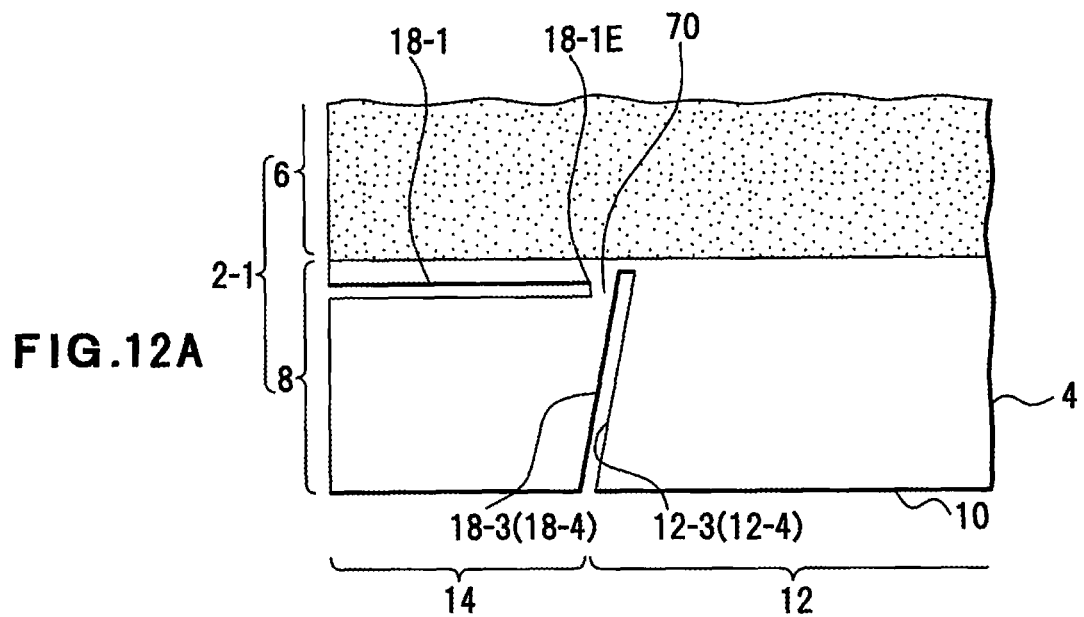
FIG.12A
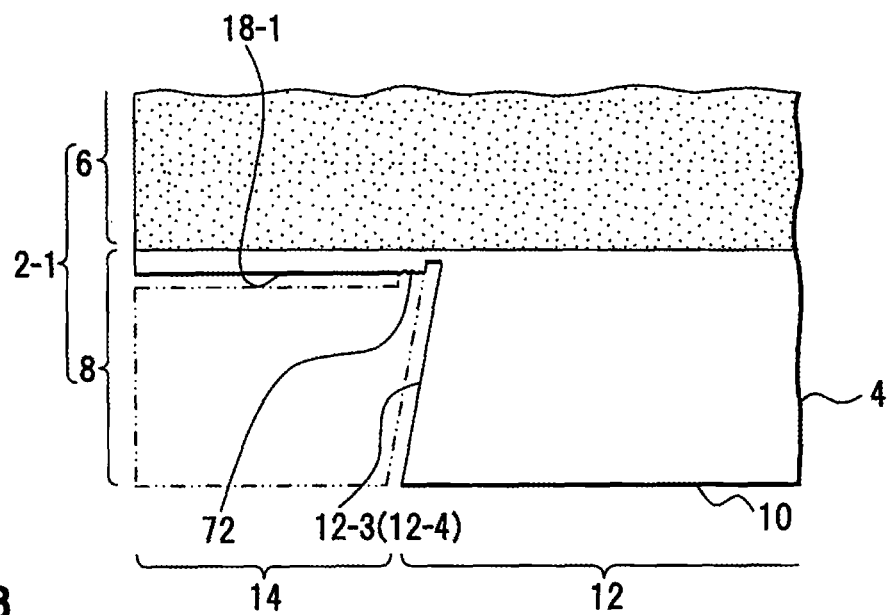
FIG.12B
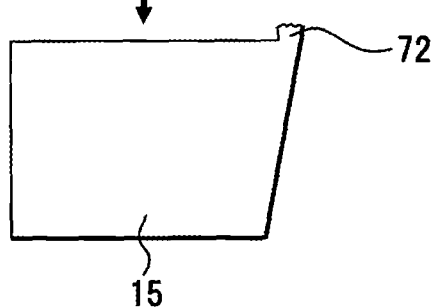

ELECTRICITY STORAGE DEVICE AND METHOD FOR MANUFACTURING SAME

CROSS-REFERENCE TO RELATED APPLICATIONS

This application is a continuation of International Application No. PCT/JP2013/006907, filed on Nov. 25, 2013, which is entitled to the benefit of priorities of Japanese Patent Application No. 2012-257360, filed on Nov. 26, 2012 and Japanese Patent Application No. 2012-257361, filed on Nov. 26, 2012, the contents of which are hereby incorporated by reference.

BACKGROUND OF THE INVENTION i) Field of the Invention

The present invention relates to electricity storage devices such as electric double-layer capacitors, electrolytic capacitors, lithium-ion capacitors and lithium-ion rechargeable batteries, and relates to methods for manufacturing the same.

ii) Description of the Related Art

Electrode bodies of anode and cathode sides wound along with separators form an electricity storage element of an electricity storage device such as an electric double-layer capacitor, an electrolytic capacitor, a lithium-ion capacitor and a lithium-ion rechargeable battery. A separator is inserted between electrode bodies of the anode and cathode sides.

A tab is connected to each of the electrode bodies of the anode and cathode sides of an electricity storage element. Alternatively, electrode bodies constitute tabs. Each tab is connected to external terminals of the anode and cathode sides. In a case of a connection structure where electrode bodies constitute tabs, any other tabs, which are separate components, are not required between an electricity storage element and an external terminal.

As to such a connection structure of an electricity storage element and an external terminal, it is known to connect an end of an electrode body of either anode or cathode side, which is selectively projected to a collecting plate (for example, Japanese Patent Application Laid-Open Publication No. 2001-68379).

BRIEF SUMMARY OF THE INVENTION

For example, a capacitor element is used in an electric double-layer capacitor as an electricity storage element. In this capacitor element, an electrode body of the anode side, first separator, an electrode body of the cathode side and second separator are layered and wound. For example, an element end-face of such a capacitor element is divided into two parts, an end of the electrode body of the anode side protrudes from one part of the element end-face, and an end of the electrode body of the cathode side protrudes from another part of the element end-face so as to form electrode leading sections. The electrode leading sections are processed by ends of the electrode bodies within the range corresponding to each portion.

FIG. 15 depicts an example of an electrode body of either anode or cathode side that is used for a capacitor element of an electric double-layer capacitor. Electrode leading sections 102 are formed on this electrode body 100. Each electrode leading section 102 orthogonally protrudes to an edge of the electrode body 100 (θ=90 degrees). In such an electrode leading section 102, stress may be applied to a part 104 between the electrode body 100 and each electrode leading section 102 when a capacitor element is wound and when a capacitor element is shaped by, for example, bend after being wound. There is a problem that in response to that stress, stress F acts on the electrode body 100 in the direction depicted by an arrow, to damage the electrode body 100 and an electrode coating part 106, such as to elongate and to crack them.

There is a problem that using a capacitor element whose electrode body 100 is damaged deteriorates its capacitor characteristics.

Such problems are common to not only electric double-layer capacitors but also electrolytic capacitors, lithium-ion capacitors and lithium-ion rechargeable batteries included in electricity storage devices.

It is an object of the present invention in view of the above described problems achieve form stability of no damage to an electrode body; for example, no crack in response to stress on any electrode leading section of the electrode body when an electricity storage element is wound and when the electricity storage element is shaped by bend, etc. after being wound.

It is another object of the present invention in view of the above described problems to provide an electricity storage device where form stability of electrode leading sections is achieved, and to provide a method for manufacturing the same.

According to a first aspect of the present invention, an electricity storage device includes an electricity storage element formed by winding an electrode body of an anode or cathode side along with a separator, and an electrode leading section having an inclined edge is formed on an element end-face of the electricity storage element by a part of the electrode body.

According to a second aspect of the present invention, a method for manufacturing an electricity storage device that includes an electricity storage element formed by winding an electrode body of an anode or cathode side along with a separator includes forming an electrode leading section having an inclined edge on an element end-face of the electricity storage element by a part of the electrode body.

Additional objects, features and advantages of the present invention will be more apparent by reference to the attached drawings and each embodiment.

BRIEF DESCRIPTION OF THE SEVERAL VIEWS OF THE DRAWING

FIG. 5 is a perspective view depicting an exploded capacitor element.

FIGS. 9A and 9B depict an electrode body and formation of its electrode leading section according to a second embodiment.

FIGS. 12A and 12B depict an electrode body and formation of its electrode leading section according to a third embodiment.

DETAILED DESCRIPTION OF THE INVENTION

First Embodiment

Figure 1A:
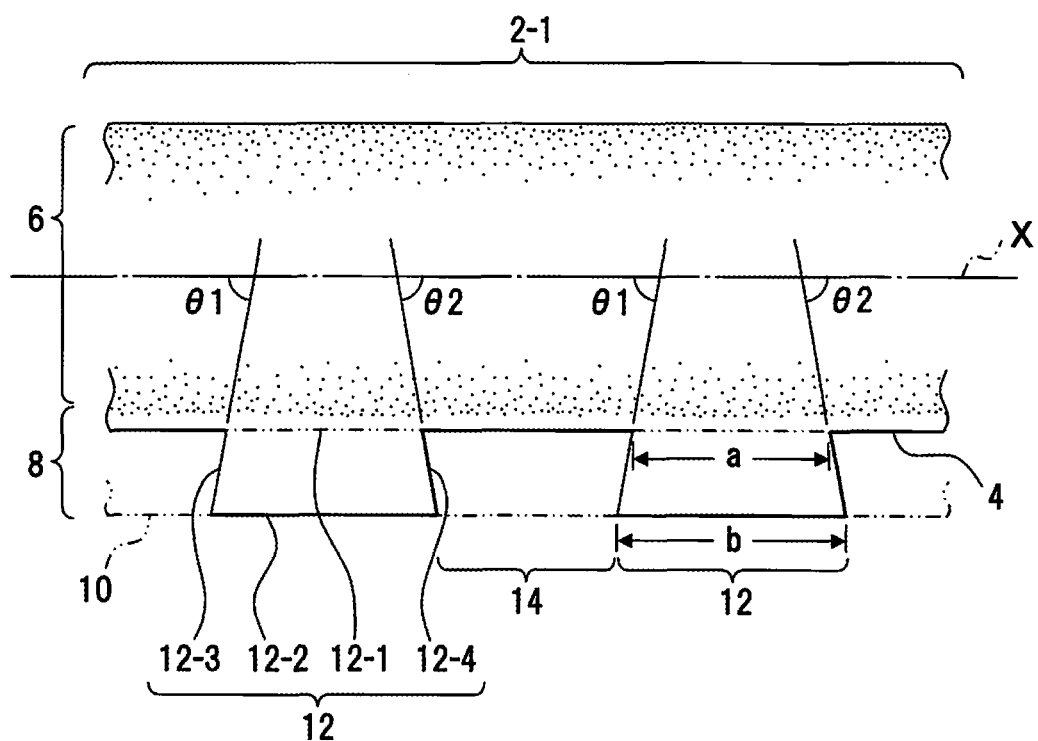
FIGS. 1A and 1B depict an electrode body of an electric double-layer capacitor according to a first embodiment.
Figure 1B:
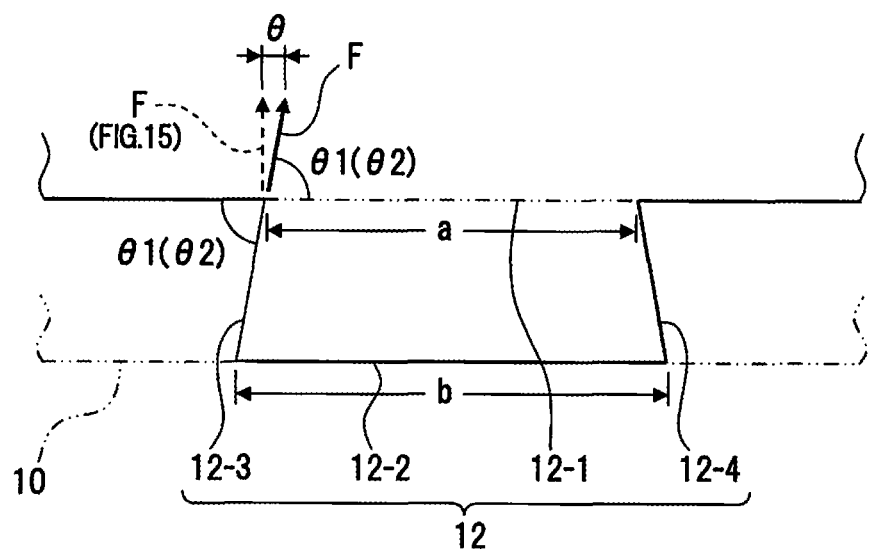

FIGS. 1A and 1B depict an example of an electrode body of the anode side of an electric double-layer capacitor according to the first embodiment. The structure depicted in each of FIGS. 1A and 1B is an example. The present invention is not limited to such a structure.

For example, an electrode coating part 6 is formed through an etching process to a surface of aluminum foil 4 of an electrode body 2-1 of the anode side. The electrode body 2-1 is an example of a current collector body. The electrode coating part 6 is an electrode function part of an electric double-layer capacitor that is an example of an electricity storage device, and is also a part where a polarizable electrode layer is formed. The polarizable electrode layer includes a polarizable material such as activated carbon. The electrode coating part 6, which is constant in width, is continuously formed on the electrode body 2-1. While there is area where the electrode coating part 6 is processed, an uncoated part 8 that is an unprocessed part of the electrode coating part 6 is provided on the electrode body 2-1. The uncoated part 8 is a part where a polarizable electrode layer is not formed, and is an example of an unprocessed part. The uncoated part 8, which is constant in width, is continuously formed in the side of an edge 10 that extends in the longitudinal direction of the electrode body 2-1. The uncoated part 8 is used for formation of a plurality of electrode leading sections 12 and removal sections 14. That is, the uncoated part 8 is an area for forming the electrode leading sections 12 and the removal sections 14.

The electrode leading sections 12 and the removal sections 14 are alternately formed on the uncoated part 8 as depicted in FIG. 1A. It is preferable as is this embodiment that each electrode leading section 12 and each removal section 14 are within the uncoated part 8. However, they may reach the electrode coating part 6. The electrode leading section 12 is a section that is formed by separation of the removal section 14. The removal section 14 is a section that is removed from the uncoated part 8. That is, the electrode leading section 12 shares one body with the electrode body 2-1, and is a remaining section of the uncoated part 8.

For example, the electrode leading section 12 and the removal section 14 in this embodiment are formed to be trapezoidal shapes as an example of a quadrangle. An upper base edge 12-1 of the electrode leading section 12 is set to an inside edge of the uncoated part 8, and its lower base edge 12-2 is set to an outside edge of the uncoated part 8. If width of the upper base edge 12-1 is represented as "a" and width of the lower base edge 12-2 is represented as "b", "a" is smaller than "b". As opposed to this, the removal section 14 has a shape symmetrical to the electrode leading section 12.

Thereby, inclining edges 12-3 and 12-4 are formed between the upper base edge 12-1 and the lower base edge 12-2 of the electrode leading section 12. The inclining edges 12-3 and 12-4 are dividing edges that divide the above described electrode leading section 12 from the removal section 14.

Inclination $\theta 1$ is set between a center line X of the electrode body 2-1 that extends in the longitudinal direction and the inclining edge 12-3, and inclination $\theta 2$ is set between the center line X and the inclining edge 12-4. Neither the inclinations $\theta 1$ nor $\theta 2$ is equal to 90 degrees. That is, the inclinations $\theta 1$ and $\theta 2$ are set obliquely. The ranges of the inclinations $\theta 1$ and $\theta 2$ are, for example: 70 degrees $<\theta 1<110$ degrees; and 70 degrees $<\theta 2<110$ degrees. Preferably, they are set in: 80 degrees $<\theta 1<100$ degrees; and 80 degrees $<\theta 2<100$ degrees. The inclinations $\theta 1$ and $\theta 2$ may be either the same ($\theta 1=\theta 2$) or different ($\theta 1\neq\theta 2$). Moreover, it is possible that one of the inclining edges 12-3 and 12-4 of the electrode body 2-1 is inclined. That is, it is possible that one of the inclining edges 12-3 and 12-4 is $\theta 1$ or $\theta 2=90$ degrees (right angle).

The electrode leading section 12 and the removal section 14 are formed before a capacitor element 16 (FIG. 5) that is an example of an electricity storage element is wound or in the middle of its winding. They can be formed by cutting the electrode body 2-1 using cutters 20-1, 20-2 and 20-3 (FIGS. 2B and 2C).

While the electrode body 2-1 of the anode side is illustrated in this embodiment, the above described electrode leading section 12 may be formed in an electrode body 2-2 of the cathode side (FIG. 5) as well.

Figure 15:
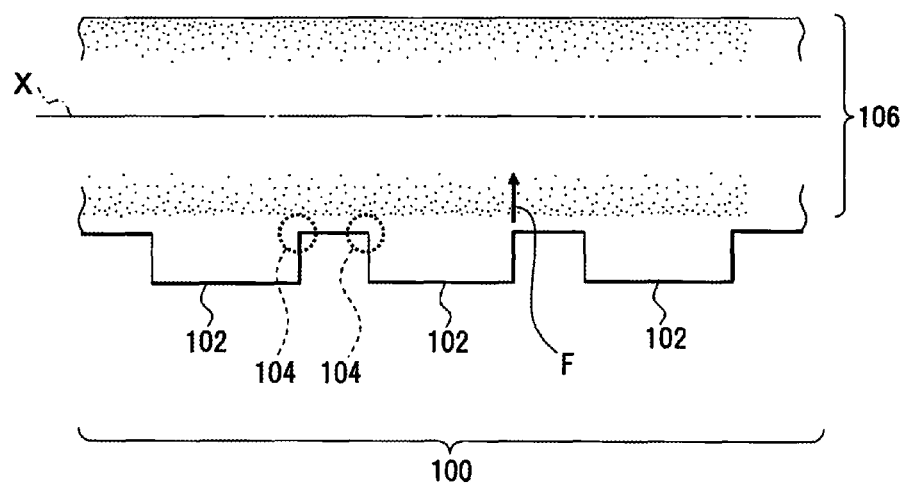
FIG. 15 depicts an electrode body where an electrode leading section is formed.

When the electrode leading section 12 with the inclining edges 12-3 and 12-4 is formed, the above allows stress F that acts on the inclining edges 12-3 and 12-4 to have the inclination $\theta 1$ (or $\theta 2$) as depicted in FIG. 1B compared with the above described stress F (FIG. 15). The inclinations $\theta 1$ and $\theta 2$ are angles oblique to the center line X of the electrode body 2-1 extending in the longitudinal direction. That is, the electrode leading section 12 is drawn from the electrode body 2-1 (2-2) with some inclination. Thus, the stress F on a leading section of the electrode leading section 12 of the electrode body 2-1 (2-2) is displaced by inclination $\theta$ (=90 degrees−$\theta 1$, or 90 degrees−$\theta 2$) to described stress F (FIG. 15) when the capacitor element 16 (FIG. 5) is wound and when the capacitor element 16 is shaped by bent, etc. after being wound. This achieves distribution of the stress F to reduce stress, makes it rare to damage the electrode body 2-1 (2-2), such as to crack the electrode body 2-1 (2-2), and can achieve form stability of the electrode leading section 12.

<Step of Forming Electrode Leading Section 12>

(1) Cutting Portion of Electrode Body 2-1 and Shape of Cutter

Figure 2A:
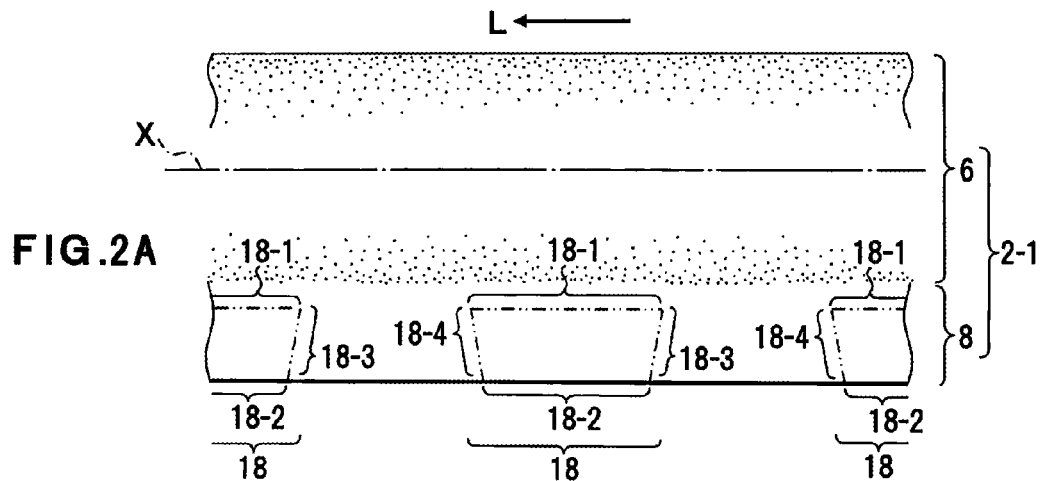
FIGS. 2A to 2C depict shapes of electrode leading sections and removal sections, cutters and a cutting process using the cutters.
Figure 2B:
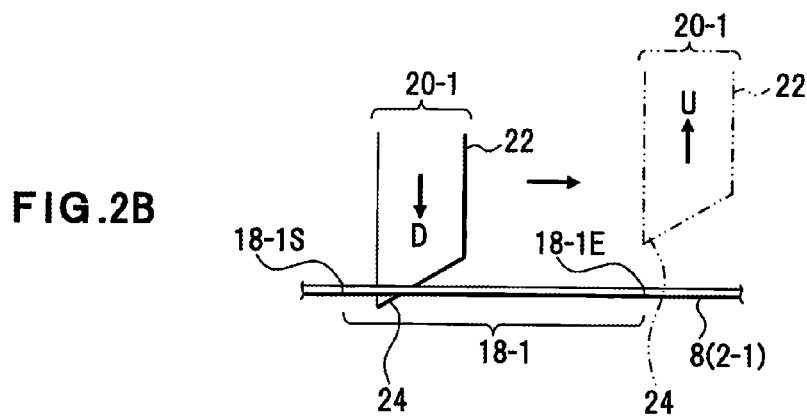
Figure 2C:
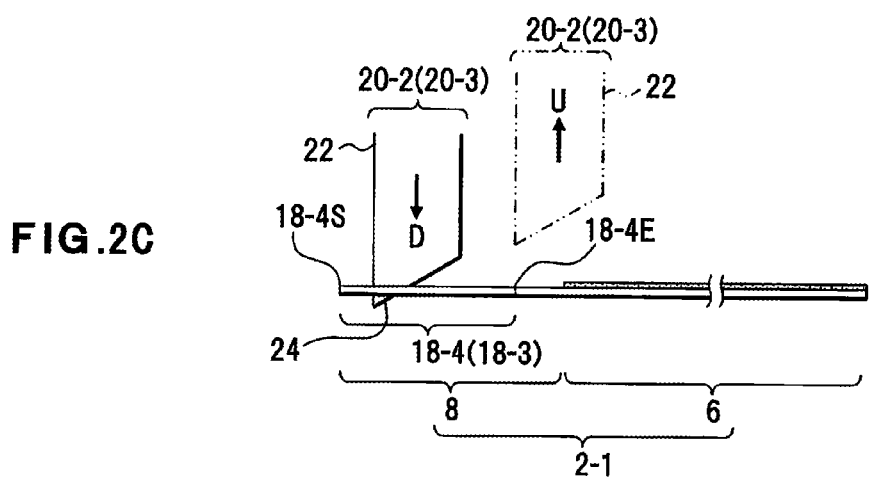

FIG. 2A depicts cutting portions of the electrode body 2-1. The electrode body 2-1 has a band form that is constant in width. The electrode body 2-1 is conveyed to a roller and wound when the capacitor element 16 is formed. That is, the electrode body 2-1 is conveyed in the longitudinal direction, for example, in the direction of an arrow L. Cut sections 18 are set in the uncoated part 8 of the electrode body 2-1 as depicted by chain double-dashed lines. Each cut section 18 includes parallel cut sections 18-1 and 18-2 and inclining cut sections 18-3 and 18-4. The parallel cut section 18-1 is an example of a cut section in the longitudinal direction of the present invention, and is a parallel cut line that is set parallel to the center line X of the electrode body 2-1. That is, the parallel cut section 18-1 cuts in the longitudinal direction of the electrode body 2-1. The inclining cut sections 18-3 and 18-4 are an example of cut sections in the crossing direction of the present invention, and are inclining cut lines where the above described inclinations θ1 and θ2 are set. That is, the inclining cut sections 18-3 and 18-4 cut in the crossing direction of the electrode body 2-1 with the inclinations θ1 and θ2. The inclinations θ1 and θ2 of the inclining cut sections 18-3 and 18-4 are in the different direction respectively in this embodiment.

FIG. 2B depicts the shape of a cutter and a cut state on the parallel cut section 18-1. A cutter 20-1 is used for cutting the parallel cut section 18-1. The cutter 20-1 is an example of a cutting means that partially cuts the electrode body 2-1 (or 2-2). The cutter 20-1 includes an acute edge of a blade 24 at the tip of a body 22.

Figure 3A:
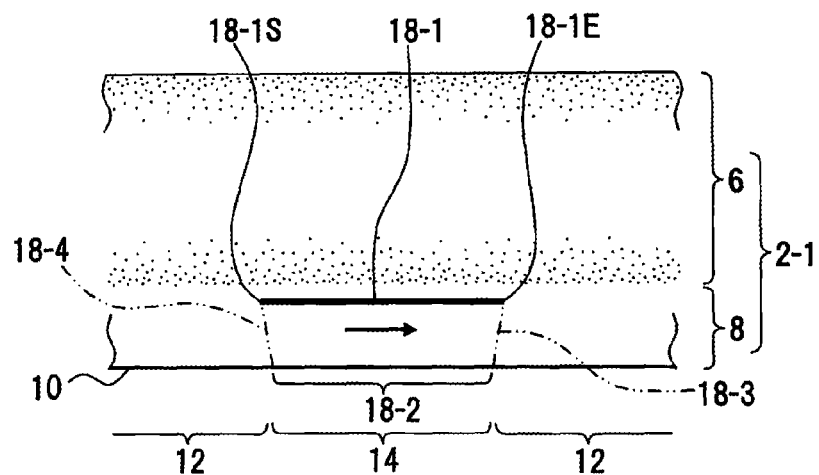
FIGS. 3A to 3C depict cutting of the electrode body.

The electrode body 2-1 is conveyed in the direction indicated by the arrow L as depicted in FIG. 2A. The edge of the blade 24 of the cutter 20-1 is inserted into a starting side 18-1S of the parallel cut section 18-1 of the electrode body 2-1 in the direction indicated by an arrow D, and the edge of the blade 24 is penetrated through the parallel cut section 18-1 of the electrode body 2-1. Since the electrode body 2-1 is conveyed in the direction of the arrow L, a portion that is the parallel section 18-1 hits the edge of the blade 24 according to the conveying force, and is cut linearly. When the edge of the blade 24 of the cutter 20-1 reaches an ending side 18-1E of the parallel cut section 18-1, the cutter 20-1 is backed in the direction indicated by an arrow U, to separate the cutter 20-1 from the electrode body 2-1. Thereby, the parallel cut section 18-1 is cut (FIG. 3A).

FIG. 2C depicts the shape of a cutter and a cut state on the inclining cut section 18-4. A cutter 20-2 is used for cutting the inclining cut section 18-4. The cutter 20-2 is an example of a cutting means that partially cuts the electrode body 2-1 (or 2-2). The cutter 20-2 includes the acute edge of the blade 24 at the tip of the body 22 as well as the cutter 20-1. The narrow edge of the blade 24 of the cutter 20-2 may be used according to the length of the inclining cut section 18-4.

Figure 3B:
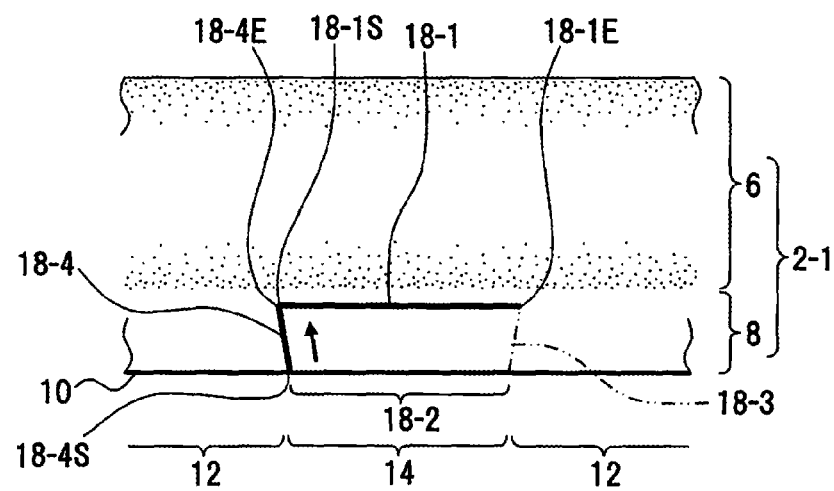

The electrode body 2-1 is conveyed in the direction indicated by the arrow L (FIG. 2A). The edge of the blade 24 of the cutter 20-2 is inserted into a starting side 18-4S of the inclining cut section 18-4 of the electrode body 2-1 in the direction indicated by the arrow D, and the edge of the blade 24 is penetrated through the inclining cut section 18-4 of the electrode body 2-1. In this case, moving the cutter 20-2 in the direction where the inclining cut section 18-4 extends, the inclining cut section 18-4 is linearly cut by the cutter 20-2 because the inclining cut section 18-4 has direction crossing the direction where the electrode body 2-1 is conveyed. The above described inclinations θ1 and θ2 may be set for the cutter 20-2 at that time. When the edge of the blade 24 of the cutter 20-2 reaches an ending side 18-4E of the inclining cut section 18-4, the cutter 20-2 is backed in the direction indicated by the arrow U, to separate the cutter 20-2 from the electrode body 2-1. Thereby, the inclining cut section 18-4 is cut (FIG. 3B).

Figure 3C:
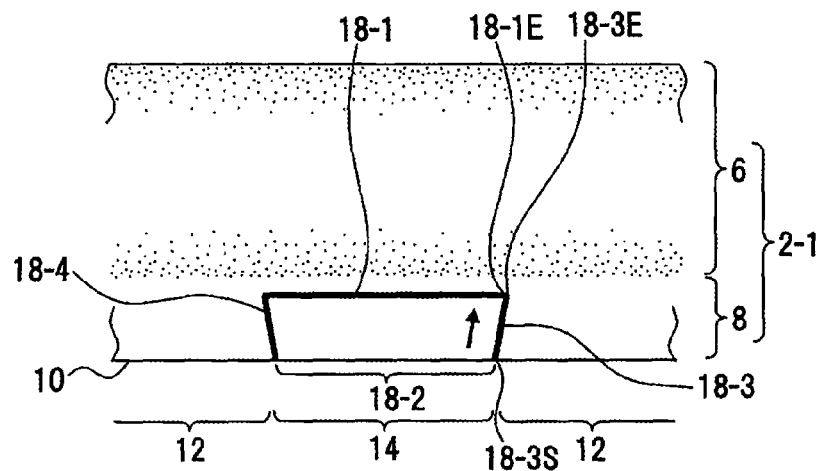

The inclining cut section 18-3 may be cut with the cutter 20-3 as well as the inclining cut section 18-4 (FIG. 3C). The above described cutting process may be performed on the electrode body 2-2 as well.

(2) Generation of Electrode Leading Section 12 and Removal Section 14

FIG. 3A depicts appearance of cutting the parallel cut section 18-1 of the electrode leading section 12. The parallel cut section 18-1 is linearly cut with the cutter 20-1 from the starting side 18-1S to the ending side 18-1E. FIG. 3B depicts appearance of cutting the inclining cut section 18-4. The inclining cut section 18-4 is linearly cut with the cutter 20-2 from the starting side 18-4S to the ending side 18-4E. FIG. 3C depicts appearance of cutting the inclining cut section 18-3. The inclining cut section 18-3 is linearly cut with the cutter 20-3 from the starting side 18-3S to the ending side 18-3E. Each arrow indicates the cutting direction. The ending side 18-4E is made to coincide with the starting side 18-1S and the ending side 18-3E is made to coincide with the ending side 18-1E. Thus, the removal section 14 that is a trapezoidal shape is formed.

Figure 4:
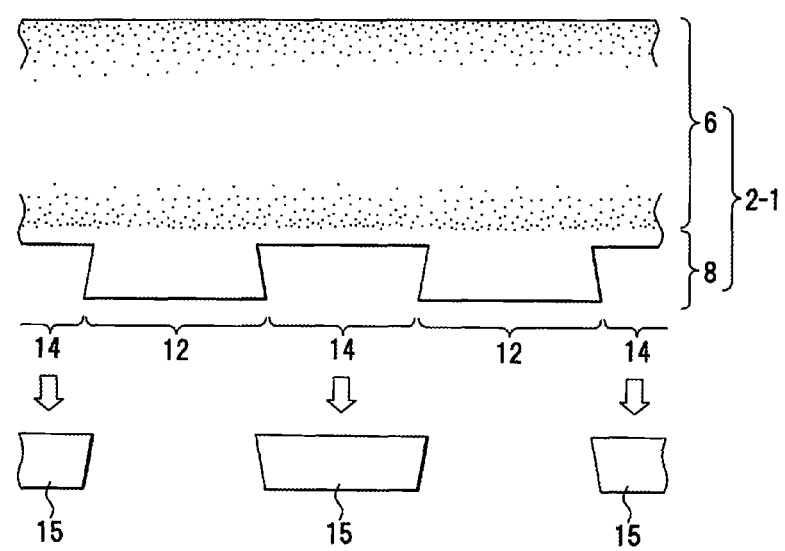
FIG. 4 depicts separation of the removal sections from the electrode body.

FIG. 4 depicts generation of the electrode leading sections 12 and the removal sections 14 of the electrode body 2-1. When removal pieces 15 that are generated by the removal sections 14 are separated from the uncoated part 8, the electrode leading sections 12 are obtained in the uncoated part 8 together with the removal sections 14.

<Step of Forming Capacitor Element 16>

FIG. 5 depicts the exploded capacitor element 16. The electrode body 2-1 of the anode side, a first separator 30-1, the electrode body 2-2 of the cathode side and a second separator 30-2 are layered and conveyed toward a winding core that is not depicted. They are wound to be the capacitor element 16, which is a cylindrical winding element, by rotation of the winding core.

The above described electrode leading sections 12 are formed in the electrode body 2-1 of the anode side and the electrode body 2-2 of the cathode side before or in the middle of winding. That is, a step of forming the electrode leading sections 12 may be either before or in the middle of winding. A dashed line 32 appended to each electrode leading section 12 is a marking-off line for bending processing (hereinafter referred to as "marking-off line 32").

The electrode leading sections 12 are formed in alternate locations, in the electrode body 2-1 of the anode side and the electrode body 2-2 of the cathode side. An element end-face 34 is formed on the capacitor element 16 by edges of the electrode bodies 2-1 and 2-2, and the separators 30-1 and 30-2. A winding core part 36 is formed in the center of the element end-face 34. The electrode leading sections 12 of the anode side (2-1) and the electrode leading sections 12 of the cathode side (2-2) are formed while the winding core part 36 is sandwiched therebetween. An isolation distance 38 is formed between the electrode leading sections 12 (2-1) and the electrode leading sections 12 (2-2).

<Step of Processing Electrode Leading Section 12>

Figure 6A:
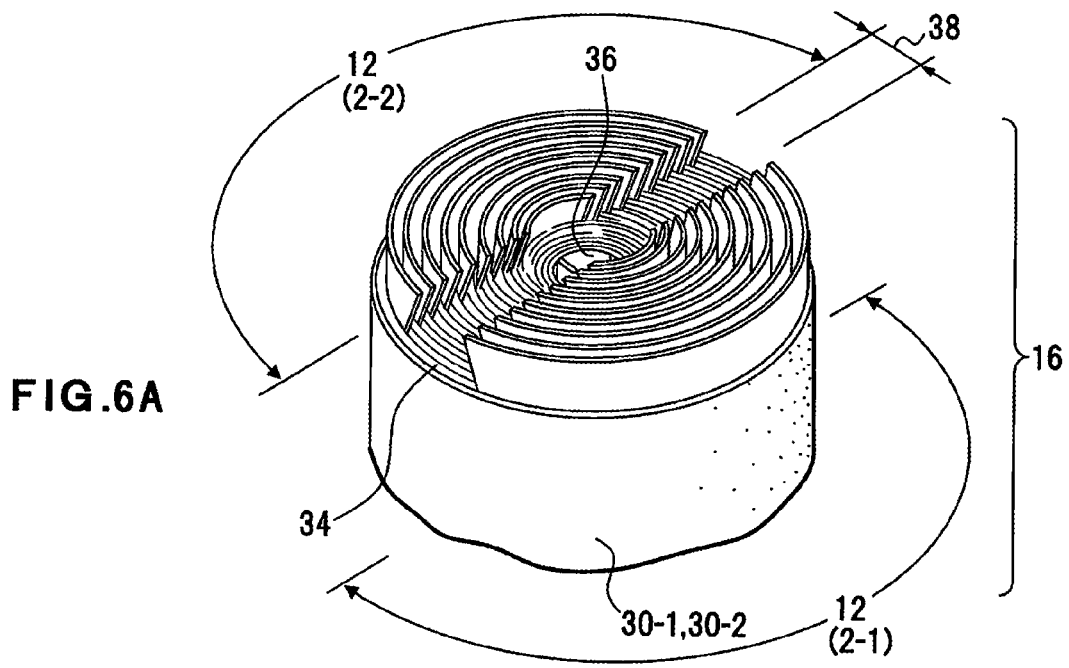
FIGS. 6A and 6B depict a capacitor element before and after a process of bending electrode leading sections.

FIG. 6A depicts the capacitor element 16 and the electrode leading sections 12. Both of the electrode leading sections 12 of the anode side and the electrode leading sections 12 of the cathode side, which are formed on the element end-face 34 of the capacitor element 16, are divided into three, each having a predetermined angle range, and are bent. This dividing process may be performed with a cutter.

Figure 6B:
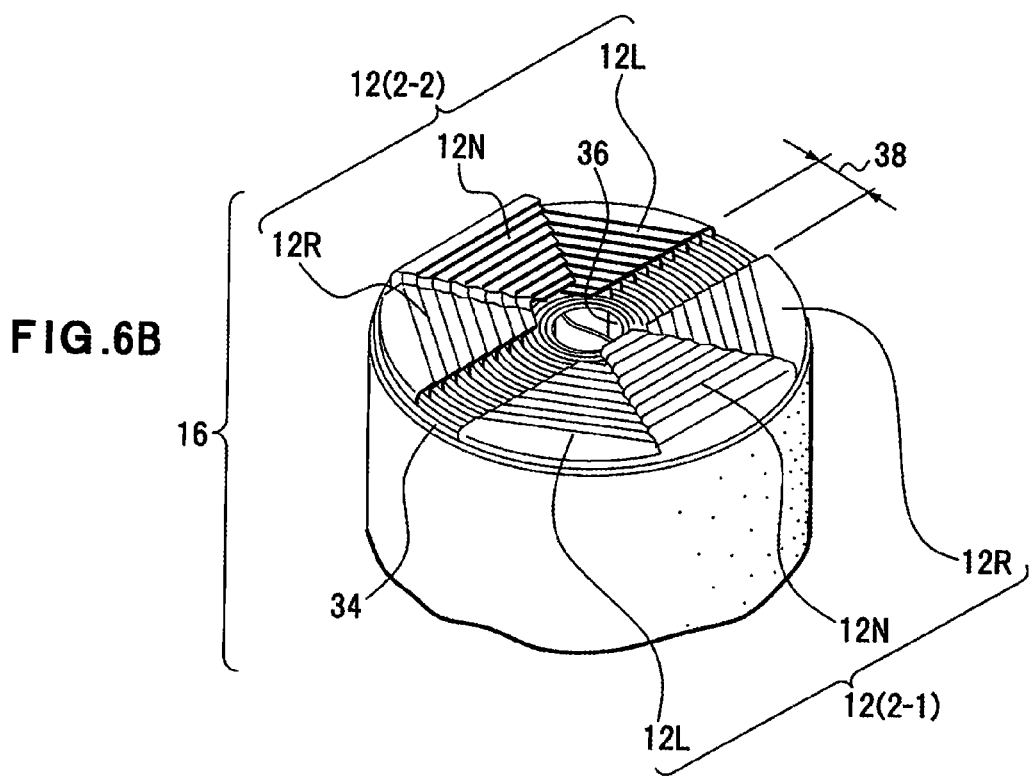

FIG. 6B depicts the capacitor element 16, and the electrode leading sections 12 after the processing. For example, a middle leading section 12N, a right leading section 12R and a left leading section 12L are bent toward the winding core part 36 as three bending areas, and the electrode leading sections 12 are flatly shaped on the element end-face 34.

<Step of Assembling Capacitor>

Figure 7:
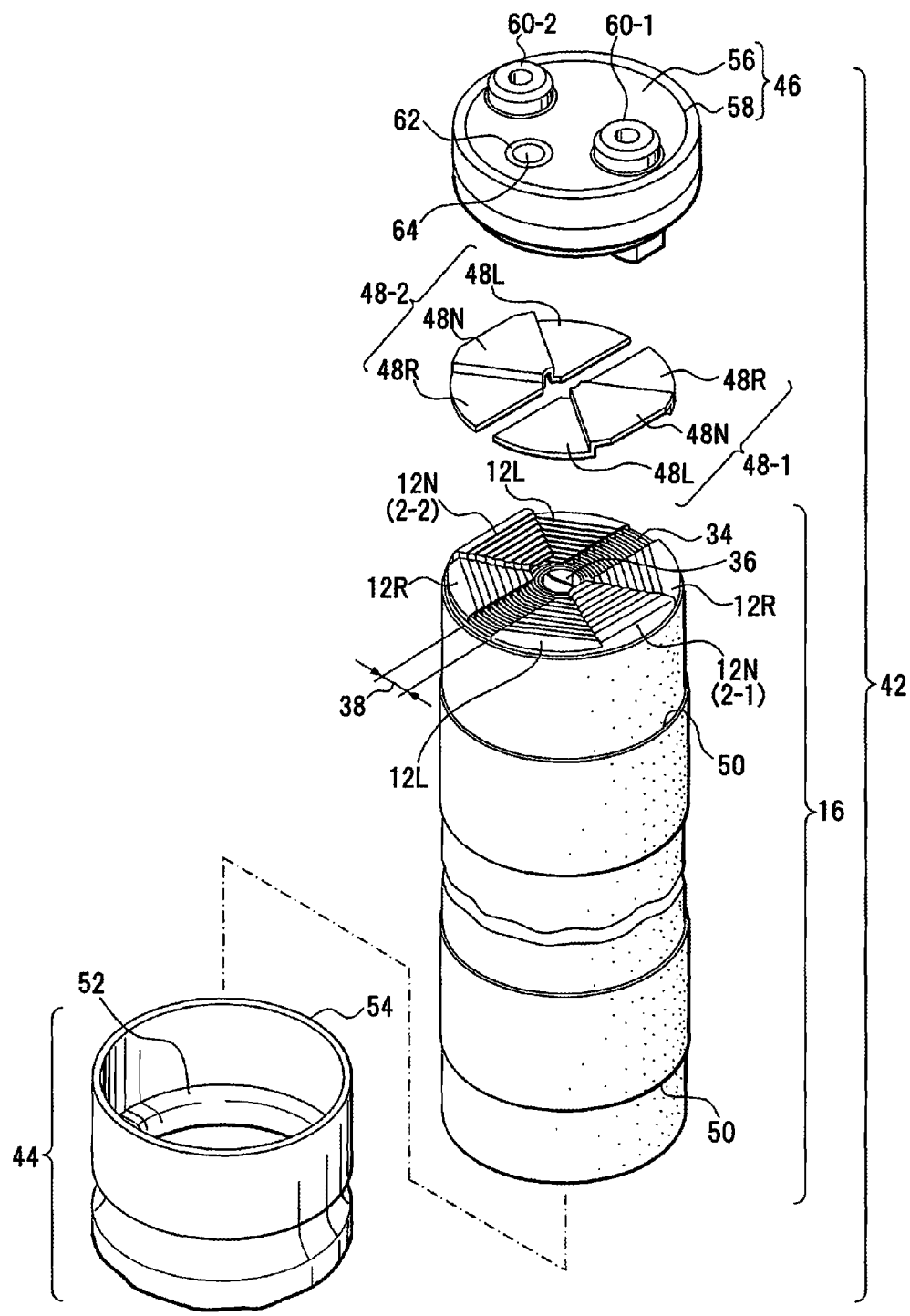
FIG. 7 is a perspective view depicting an example of an electric double-layer capacitor.
Figure 8:
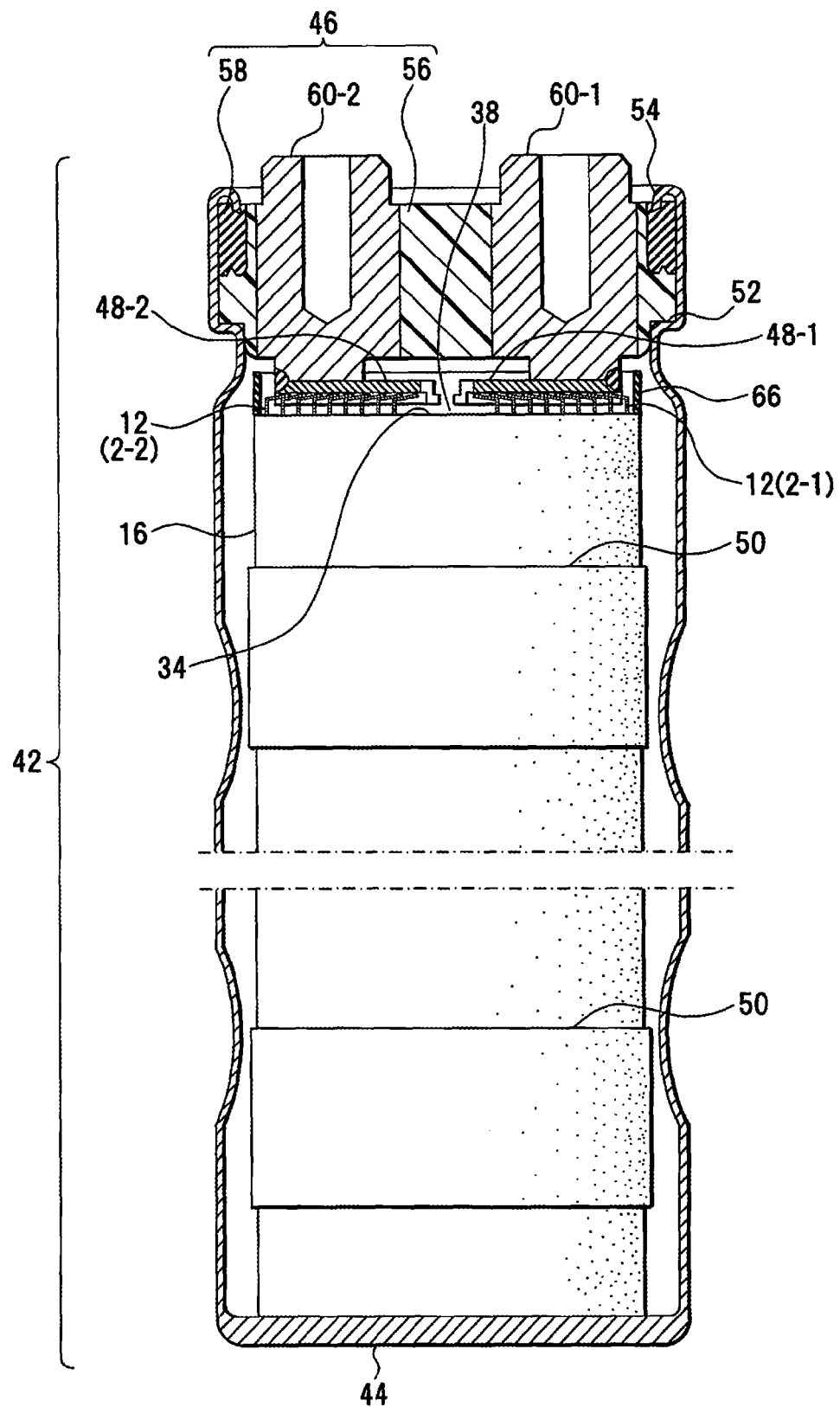
FIG. 8 is a cross-sectional view depicting the electric double-layer capacitor.

FIG. 7 depicts an exploded electric double-layer capacitor. FIG. 8 depicts a longitudinal section of the electric double-layer capacitor.

An electric double-layer capacitor 42 is an example of the electricity storage device of the present invention. The electric double-layer capacitor 42 includes the capacitor element 16, which is an example of the above described electricity storage element, an outer packaging case 44, a sealing plate 46 and current collector plates 48-1 and 48-2 of the anode and cathode sides.

Keeping tapes 50 are wound around the outer circumference of the capacitor element 16. The keeping tapes 50 prevent the electrode bodies 2-1 and 2-2, and the separators 30-1 and 30-2 from rewinding, to keep the shape of the capacitor element 16.

The outer packaging case 44 houses the capacitor element 16. A step 52 that locks a sealing plate 46 is formed in the outer packaging case 44 by crimping. A curling process for holding the sealing plate 46 uses an opening end 54 of the outer packaging case 44.

The sealing plate 46 is a member that seals the opening of the outer packaging case 44. A sealing part 58 is formed around a base part 56 of the sealing plate 46. For example, the base part 56 is a hard synthetic resin plate. For example, the sealing part 58 is a ring body formed by high hermetic rubber etc.

The base part 56 is a molded body of a hard synthetic resin. An external terminal 60-1 of the anode side and an external terminal 60-2 of the cathode side are fixed to the base part 56 by insert molding. A through hole 62 is formed in the base part 56. A pressure valve 64 is disposed in the through hole 62. The pressure valve 64 emits gas in the outer packaging case 44, and is opened when the internal pressure in the case suddenly rises, to adjust pressure.

The current collector plate 48-1 is disposed between and connected to the external terminal 60-1 and the middle leading section 12N of the electrode leading sections 12 (2-1). The current collector plate 48-2 is disposed between and connected to the external terminal 60-2 and the middle leading section 12N of the electrode leading sections 12 (2-2).

A fan-shaped middle connection section 48N is formed on each current collector plate 48-1 and 48-2. Fan-shaped left side connection section 48L and right side connection section 48R are formed while the middle connection section 48N is sandwiched therebetween. The middle connection section 48N encompasses the middle leading section 12N of the electrode leading sections 12 (2-1), or the electrode leading sections 12 (2-2), and is a fan-shaped bulge that is connected to the top surface of the middle leading section 12N. The left side connection section 48L is a fan-shaped section that is connected to the left leading section 12L of the electrode leading sections 12 (2-1), or the electrode leading sections 12 (2-2). The right side connection section 48R is a fan-shaped section that is connected to the right leading section 12R of the electrode leading sections 12 (2-1), or the electrode leading sections 12 (2-2).

In the case of such an electric double-layer capacitor 42, the capacitor element 16 is housed in the outer packaging case 44 after the outer packaging case 44 is processed. In advance, the current collector plate 48-1 is connected to the electrode leading sections 12 (2-1) of the capacitor element 16 by laser welding, and the current collector plate 48-2 is connected to the electrode leading sections 12 (2-2) of the capacitor element 16 by laser welding.

A side surface of the external terminal 60-1 of the anode side is connected to a side surface of the current collector plate 48-1 by laser welding, and a side surface of the external terminal 60-2 of the cathode side is connected to a side surface of the current collector plate 48-2 by laser welding. Thereby, the external terminals 60-1 and 60-2 are electrically connected to the capacitor element 16.

The sealing plate 46, which is inserted into the outer packaging case 44 along with the capacitor element 16, hits the step 52 of the outer packaging case 44, and is positioned and held. As depicted in FIG. 8, a curling process is performed on the opening end 54 of the outer packaging case 44, to make the opening end 54 to bite into the sealing part 58, and a sealing process of the outer packaging case 44 is performed. Thereby, the electric double-layer capacitor 42 is formed as depicted in FIG. 8.

In the electric double-layer capacitor 42, an insulation ring 66 is disposed on the top side of the element end-face 34 of the capacitor element 16. The insulation ring 66 is an example of an insulation means that insulates the electrode leading sections 12 (2-1) and 12 (2-2), and the external terminal 60-1 of the anode side and the external terminal 60-2 of the cathode side, from the outer packaging case 44.

<Effects of First Embodiment>

(1) According to the first embodiment, form stability of the electrode leading sections 12, which are formed in the edges 10 of the electrode bodies 2-1 and 2-2, can be achieved.

(2) Excessive stress applied on the electrode bodies 2-1 and 2-2 and cracks occurring in the electrode bodies 2-1 and 2-2 and the electrode coating part 6 due to winding of the electrode bodies 2-1 and 2-2 and due to bending of the electrode leading sections 12 after the winding can be limited.

(3) Since the inclined edges 12-3 and 12-4 having the inclinations $\theta1$ and $\theta2$, which are angles oblique to the electrode leading section 12, are formed in the electrode bodies 2-1 and 2-2, damage such as cracks in the electrode bodies 2-1 and 2-2 can be prevented even if stress is applied to the electrode bodies 2-1 and 2-2.

(4) Concerning drawing of the electrode leading section 12, the advantage is that a large area for the drawing can be ensured. In addition, the root of the electrode leading section 12 is thin so as to be bent easily. This is also an advantage.

(5) If the inclinations $\theta1$ and $\theta2$ are smaller than 90 degrees (in a case of acute angles); for example, if the inclining edges 12-3 and 12-4 of the electrode leading section 12 are formed with the inclinations $\theta1$ and $\theta2$ nearly equal to 80 degrees, it is easy to be achieved to isolate the anode side from the cathode side when the electrode leading section 12 is bent.

(6) If the inclinations $\theta1$ and $\theta2$ are larger than 90 degrees (in a case of obtuse angles), areas for connecting the electrode leading sections 12 to the current collector plates 48-1 and 48-2 can be widened.

(7) These effects can realize an electricity storage device of high reliability such as the electric double-layer capacitor 42, an electrolytic capacitor, a lithium-ion capacitor and a lithium-ion rechargeable battery.

Second Embodiment

FIGS. 9A and 9B depict an example of an electrode body of the anode side and a step of forming an electrode leading section according to the second embodiment of the present invention. The structure depicted in FIGS. 9A and 9B are an example, and the present invention is not limited to such a structure.

The electrode leading section 12 is formed by cutting the edge 10 of the electrode body 2-1. Therefore, there may be a case where a portion that is not cut remains between an electrode body of an electricity storage element and a removed portion if the accuracy of the formation is not sufficient. If such a portion that is not cut irregularly remains, a part that should be removed partly remains in the electrode body 2-1 and the shape of the electrode leading section 12 is not fixed. That is, part of the removal section 14 remains in the electrode body 2-1 due to a portion that is not cut; if this remaining part of the removal section is torn off the electrode body 2-1, stress acts on the electrode body 2-1 of the capacitor element 16, and threatens to stress, for example, to elongate the electrode body 2-1, and to damage, for example, to crack the electrode body 2-1.

It may occur in the electrode body 2-1 of the anode side, where a polarizable electrode layer is formed, that the polarizable electrode layer is damaged and its metal portion is exposed when the removal section 14 is separated. Using such an electrode body 2-1 threatens to deteriorate electric characteristics including capacitor characteristics.

As to such partial cutting of the electrode body 2-1, as depicted in FIG. 9A, the parallel cut section 18-1 of the removal section 14 extends toward the electrode leading section 12 side beyond the inclining cut sections 18-3 and 18-4. That is, a cutting area of the parallel cut section 18-1 extends beyond the inclining cut sections 18-3 and 18-4. A narrow uncut part 70 is formed between the parallel cut section 18-1, and the inclining cut section 18-3 (18-4).

When the uncut part 70 is torn, the removal section 14 is removed from the electrode body 2-1 and the electrode leading section 12 is formed on the electrode body 2-1 as depicted in FIG. 9B. In this case, a torn part 72 is generated on the uncut part 70. Since the parallel cut section 18-1 is formed beyond the inclining cut sections 18-3 (18-4), the uncut part 70 is a narrow part that is between the parallel cut section 18-1 and the inclining cut section 18-3 (18-4). Thus, if force in the direction of taking the removal section 14 apart from the electrode body 2-1 is applied to the removal section 14, the removal peace 15 is torn off and easily separated from the removal section 14 of the electrode body 2-1. That is, it becomes easy to tear off the removal peace 15, no torn portion spreads, and the removal peace 15 can be cut off just by the width of the uncut part 70. Thereby, the accuracy of forming the electrode leading section 12 and the removal section 14 is improved, and it is achieved to stabilize the form of the electrode leading section 12.

<Generation of Electrode Leading Section 12 and Removal Section 14>

Figure 10A:
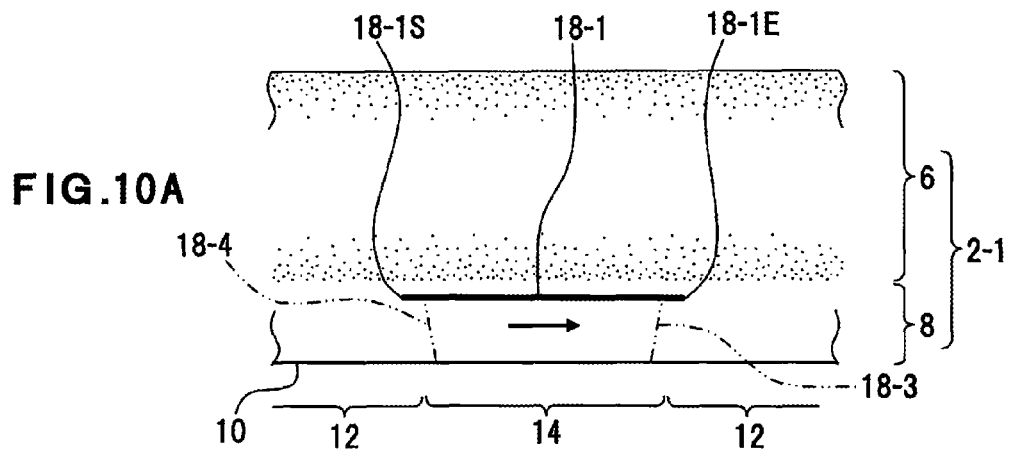
FIGS. 10A to 10C depict cutting of the electrode body.
Figure 10B:
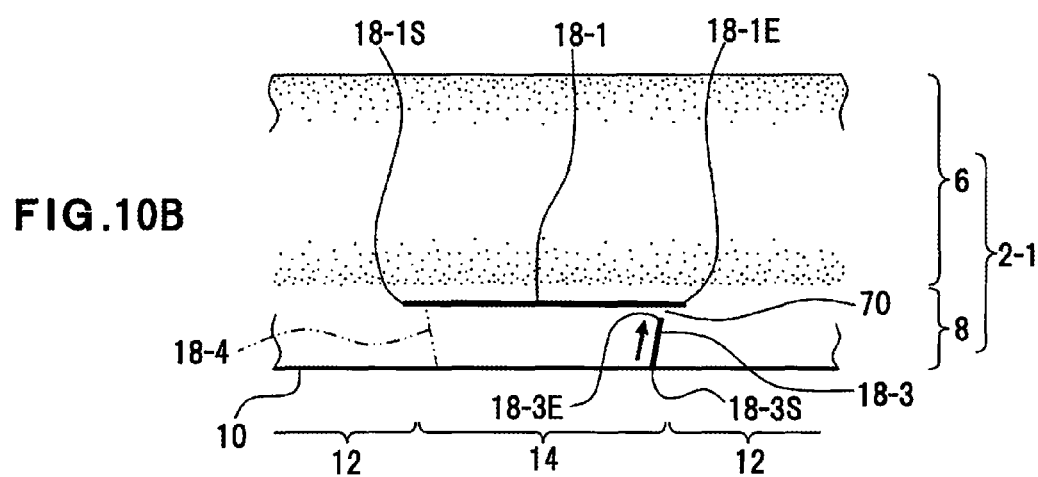
Figure 10C:
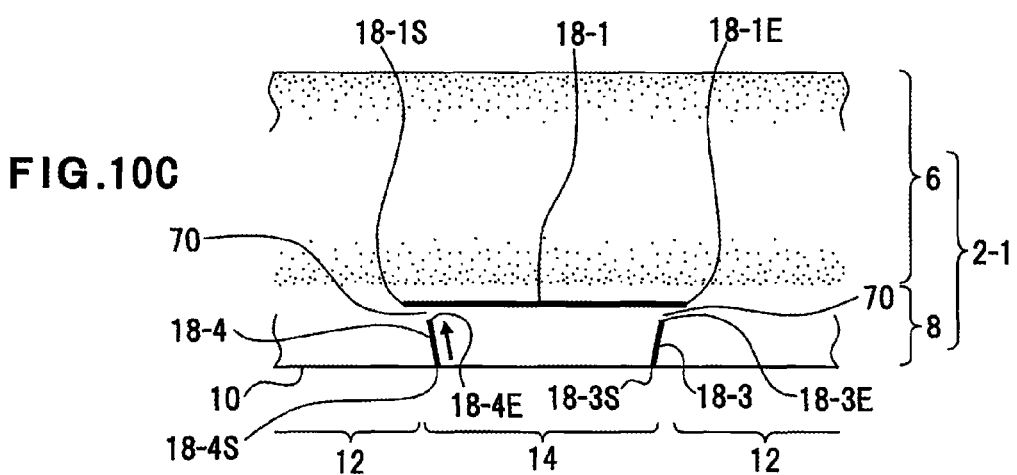

The parallel cut section 18-1 of the electrode leading section 12, for example, as depicted in FIG. 10A, is linearly cut with the cutter 20-1 from the starting side 18-1S to the ending side 18-1E. The inclining cut section 18-3 of the electrode leading section 12, for example, as depicted in FIG. 10B, is linearly cut with the cutter 20-3 from the starting side 18-3S to the ending side 18-3E. The inclining cut section 18-4 of the electrode leading section 12, for example, as depicted in FIG. 10C, is linearly cut with the cutter 20-2 from the starting side 18-4S to the ending side 18-4E.

Figure 11A:
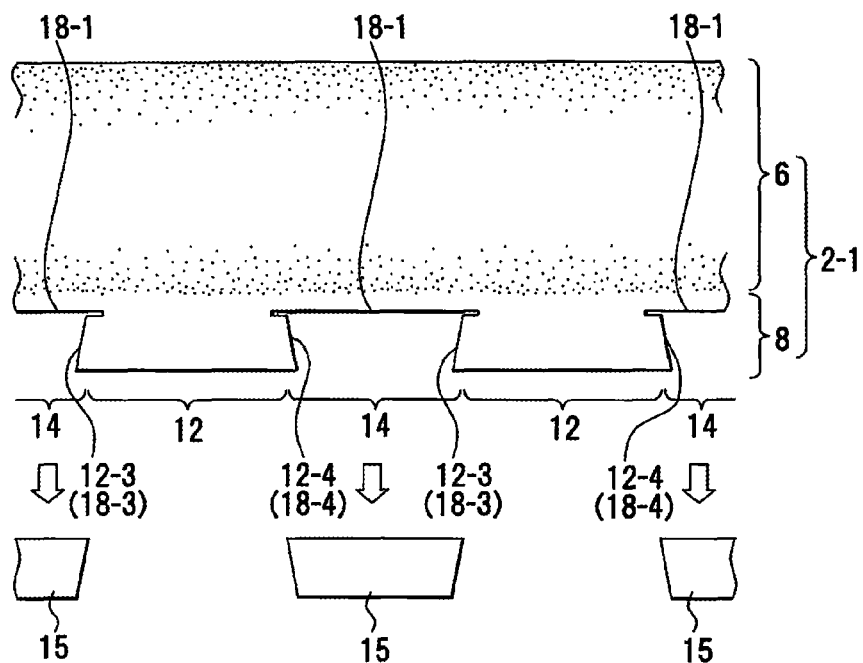
FIGS. 11A and 11B depict separation of the removal sections from the electrode body.

FIG. 11A depicts generation of the electrode leading sections 12 and the removal sections 14 of the electrode body 2-1. When the removal pieces 15 that are generated by the removal sections 14 are separated from the uncoated part 8, the electrode leading sections 12 are obtained in the uncoated part 8 together with the removal sections 14.

Figure 11B:
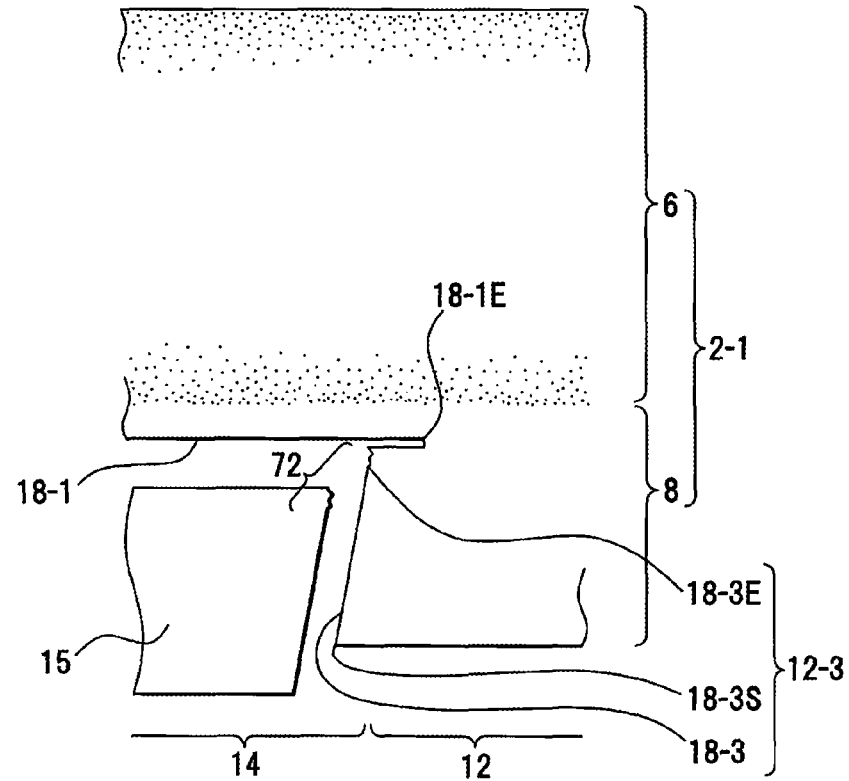

As depicted in FIG. 11B, the ending side 18-E of the parallel cut section 18-1 does not coincide with the ending side 18-3E of the inclining cut section 18-3 and the removal piece 15 is torn at the uncut part 70, to be generated. In this case, it can be prevented that cracks due to the tearing spread to the electrode leading section 12 or the electrode body 2-1, and it is achieved to stabilize the form of the electrode leading section 12 and the removal section 14.

<Effects of Second Embodiment>

(1) Even if the removal section 14, which is formed for forming the electrode leading section 12, is removed, stress acting on the electrode bodies 2-1 and 2-2 can be limited, and no stress such as elongation or no damage such as cracks occurs. Thereby, according to the electricity storage device of the present invention, electric characteristics including capacitor characteristics, such as to reduce electric power loss and to keep conductivity can be prevented from deteriorating.

(2) Since at least the parallel cut sections 18-1 are cut beyond the inclining cut sections 18-3 and 18-4, the direction of each crack is different from direction of the electrode coating part 6, which is an electrode area. Thereby, the electrode coating part 6 can be protected, and the residual ratio of the uncut part 70 can be decreased.

(3) The distance between the parallel cut section 18-1 and the electrode coating part 6, which is an electrode area, can be set to be narrow, for example, about 0.3 to 2 (mm), and the removal sections 14 can be formed within the width of the uncoated part 8. The electrode area of the electrode coating part 6 is not sacrificed. These are advantages.

Third Embodiment

FIGS. 12A and 12B depict a parallel cut section and an inclining cut section according to the third embodiment.

In the third embodiment, the removal sections 14 are also formed by the parallel cut section 18-1 and the inclining cut sections 18-3 and 18-4. The parallel cut section 18-1 is cut in the longitudinal direction of the electrode body 2-1. The inclining cut sections 18-3 and 18-4 are cut in the crossing direction of the electrode body 2-1.

In the second embodiment, the parallel cut section 18-1 extends toward the electrode leading section 12 beyond the inclining cut section 18-3 (18-4). The narrow uncut part 70 is formed between the parallel cut section 18-1 and the inclining cut section 18-3 (18-4).

On the contrary, in the third embodiment, the ending side 18-1E is set before the parallel cut section 18-1 reaches the inclining cut section 18-3 (18-4). Each inclining cut section 18-3 and 18-4 extends toward the inside edge of the uncoated part 8 beyond the parallel cut section 18-1. The narrow uncut part 70 is formed between the inclining cut section 18-3 (18-4), and the parallel cut section 18-1. That is, the uncut part 70 is formed between the end of the parallel cut section 18-1 and the cut area of the inclining cut section 18-3 (18-4). In addition, the inclining cut section 18-3 (18-4) extends beyond the cut area of the parallel cut section 18-1.

When the uncut part 70 is torn, the removal section 14 is removed from the electrode body 2-1 and the electrode leading section 12 is formed on the electrode body 2-1 as depicted in FIG. 12B. In this case, the torn part 72 is generated on the uncut part 70. Since the inclining cut section 18-3 (18-4) is formed beyond the cut area of the parallel cut section 18-1, the uncut part 70 is a narrow part that is between the parallel cut section 18-1 and the inclining cut section 18-3 (18-4).

Thus, if force in the direction of taking the removal section 14 apart from the electrode body 2-1 is applied to the removal section 14, the removal peace 15 is torn off and easily separated from the removal section 14 of the electrode body 2-1. That is, in the third embodiment, as well as the second embodiment, it becomes easy to tear off the removal peace 15, no torn portion spreads, and the removal peace 15 can be cut off just by the width of the uncut part 70. Thereby, the accuracy of forming the electrode leading section 12 and the removal section 14 is improved, and it is achieved to stabilize the form of the electrode leading section 12.

Since the inclining cut sections 18-3 and 18-4 are set beyond the cut area of the parallel cut section 18-1 in this embodiment, it is required to take care not to damage the electrode areas of the electrode bodies 2-1 and 2-2, that is, each area where the electrode coating part 6 is processed. A cutting process and a removing process are also performed on the electrode body 2-2 as well as the electrode body 2-1 in this embodiment.

Fourth Embodiment

Figure 13A:
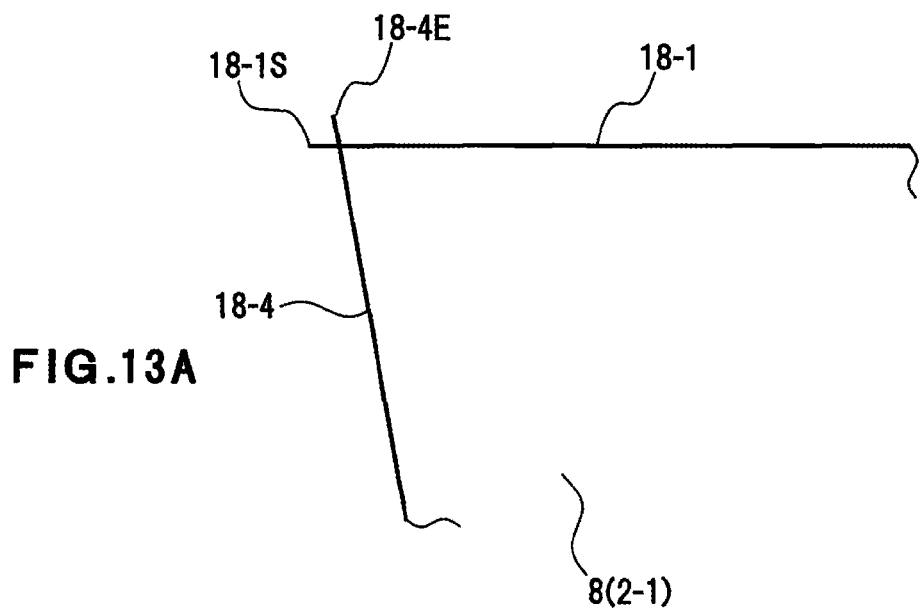
FIGS. 13A and 13B depict a parallel cut section and inclining cut sections according to a fourth embodiment.
Figure 13B:
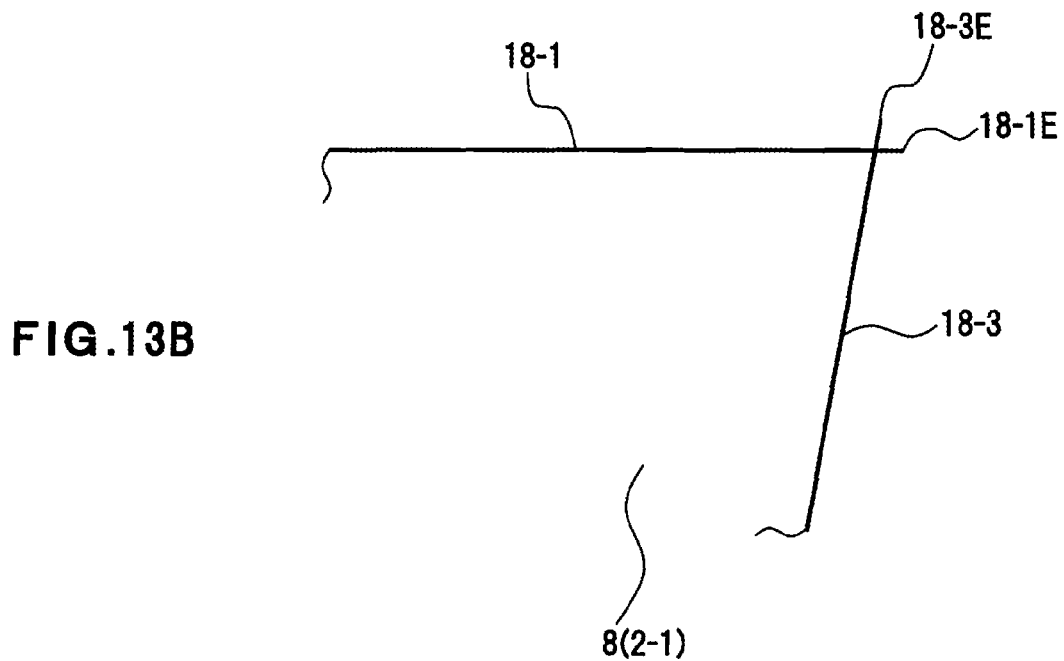

FIGS. 13A and 13B depict a parallel cut section and an inclining cut section according to the fourth embodiment.

In the first embodiment, as depicted in FIGS. 3A to 3C, the ending side 18-4E of the inclining cut section 18-4 is made to coincide with the starting side 18-1S of the parallel cut section 18-1, and the ending side 18-3E of the inclining cut section 18-3 is made to coincide with the ending side 18-1E of the parallel cut section 18-1 in the electrode leading section 12.

In the fourth embodiment, as depicted in FIG. 13A, the parallel cut section 18-1 is made to cross the inclining cut section 18-4, and as depicted in FIG. 13B, the parallel cut section 18-1 is made to cross the inclining cut section 18-3 in the electrode leading section 12. If cuts are made under setting like the above, a part that is not cut is prevented from remaining, the accuracy of forming the electrode leading section 12 is improved, and it is achieved to stabilize the form of the electrode leading section 12.

<Variations of Electrode Leading Section 12 and Removal Section 14>

Figure 14A:
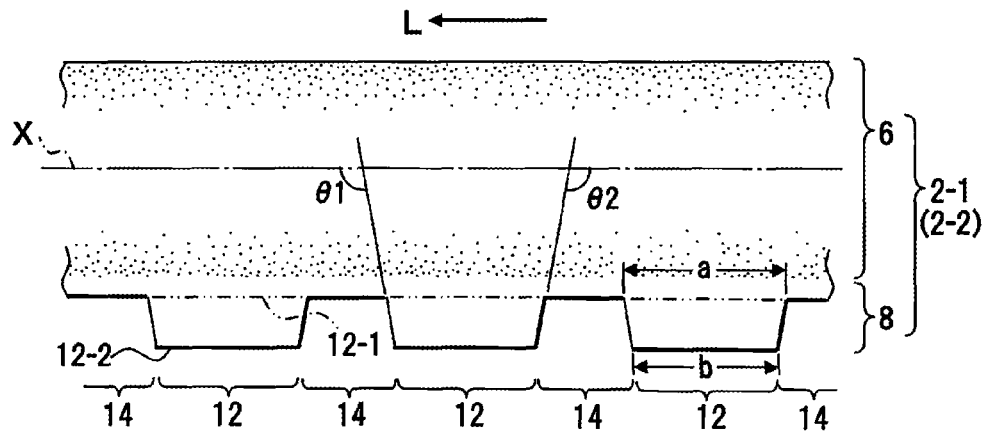
FIGS. 14A to 14C depict variations of an electrode leading section.
Figure 14B:
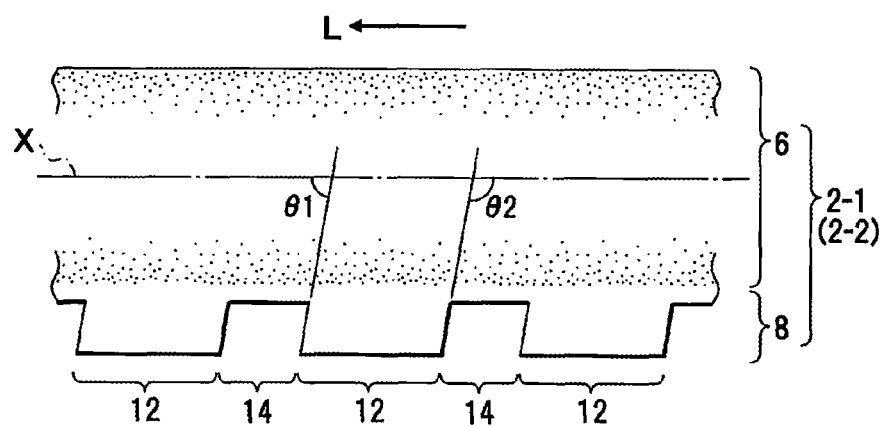
Figure 14C:
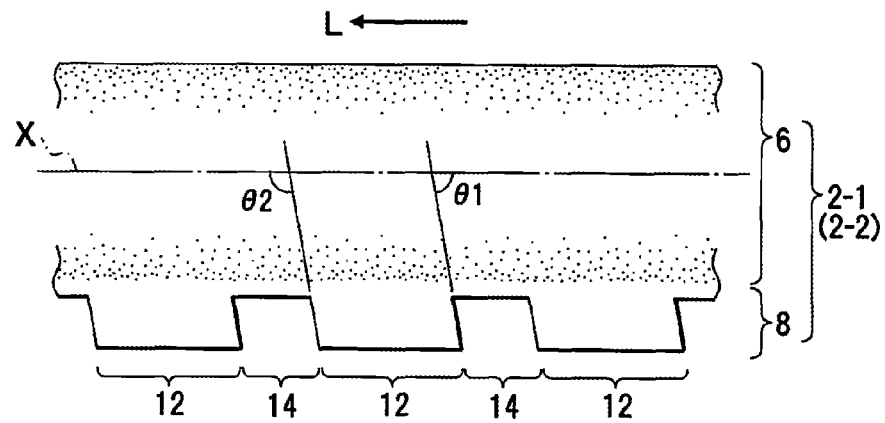

FIGS. 14A to 14C depict variations of the electrode leading section 12. In the above embodiment, the electrode leading section 12 is a trapezoidal shape, and the upper base edge 12-1, which is narrower than the lower base edge 12-2, is fixed to an inside edge (FIG. 1A). On the contrary, in FIG. 14A, the lower base edge 12-2, which is narrower than the upper base edge, may be fixed to an outside edge. That is, "a" may be set larger than "b".

The shape of the electrode leading section 12 is not limited to a trapezoidal shape that is an example of a quadrangle. As depicted in FIGS. 14B and 14C, the electrode leading section 12 may be formed to be a parallelogram that is an example of the quadrangle. The direction of opening by each inclination θ1 and θ2 may be either the same or opposite direction to the direction L where the electrode bodies 2-1 and 2-2 are conveyed.

According to such variations, it can also be achieved to stabilize the form of the electrode leading section 12, and an electricity storage device of high reliability such as the electric double-layer capacitor 42 can be realized.

Other Embodiments (1) In the above embodiments, both side ends of the electrode leading section 12 are formed by the inclining edges 12-3 and 12-4 respectively. Preferably, both side ends of the electrode leading section 12 may be formed by the inclining edges 12-3 and 12-4 respectively as the above embodiments. Concerning the inclining edges 12-3 and 12-4, either side end of the electrode leading section 12 may be formed by the inclining edge 12-3 or 12-4.

(2) The capacitor element 16 is formed by winding the electrode bodies 2-1 and 2-2 a plurality of times, and includes a plurality of electrode leading sections 12. It is not required that every electrode leading section 12 includes the inclining edges 12-3 and 12-4. Some of the electrode leading sections 12 may include the inclining edges 12-3 and 12-4. That is, either the inclining edge 12-3 or 12-4 may be provided for a place where stress is concentrated and where damage is expected to occur.

(3) In the above embodiments (FIGS. 3B and 3C, and FIGS. 10B and 10C), the starting side 18-4S of the inclining cut section 18-4 is set at the edge 10 side of the electrode body 2-1. The starting side 18-4S of the inclining cut section 18-4 may be set at the parallel cut section 18-1 side (that is, it may be cut in the direction opposite to the arrows in FIGS. 3B and 10B). The starting side 18-3S of the inclining cut section 18-3 is set at the edge 10 side of the electrode body 2-1. The starting side 18-3S of the inclining cut section 18-3 may be set at the parallel cut section 18-1 side (that is, it may be cut in the direction opposite to the arrows in FIGS. 3C and 10C).

(4) In the above embodiments, means except cutters may be used for the method for cutting off the electrode leading sections 12 and the removal sections 14 from the electrode bodies 2-1 and 2-2. For example, stamping or the like may be used.

(5) In the above embodiments, the electric double-layer capacitor 42 is illustrated as an example of an electricity storage device. An electrolytic capacitor may be an example of an electricity storage device. In case of an electrolytic capacitor, for example, unprocessed parts of the electrode bodies 2-1 and 2-2 (uncoated part 8) may be portion where etching layer and oxide layer are not formed. The electrode leading section 12 and the removal section 14 may be formed within unprocessed parts (uncoated part 8) of oxide layer and polarizable electrode layer. An electricity storage device may be a lithium-ion capacitor or a lithium-ion rechargeable battery.

(6) In the above embodiments, the direction where the electrode bodies 2-1 and 2-2 are conveyed is set in the left (L). This direction may be set in the right (R). In this case, the direction of cutting the parallel cut section 18-1 may be set in the direction either opposite or same to the conveying direction.

Aspects of the electricity storage device or the method for manufacturing the electricity storage device extracted from the embodiments described above are as follows.

An electricity storage device includes an electricity storage element formed by winding an electrode body of an anode or cathode side along with a separator. An electrode leading section having an inclined edge is formed on an element end-face of the electricity storage element by a part of the electrode body.

In the electricity storage device, preferably the inclined edge may have an inclination that is an angle oblique to a center line of the electrode body in a longitudinal direction.

In the electricity storage device, preferably the electrode leading section may have a shape of a quadrangle including the inclined edge.

In the electricity storage device, preferably the electricity storage element may alternately include a removal section and the electrode leading section on an edge of the electrode body before or in the middle of winding. The removal section may include a cut section in a longitudinal direction and a cut section in a crossing direction, the cut section in the longitudinal direction may be cut in the longitudinal direction of the electrode body, and the cut section in the crossing direction may be cut in the crossing direction of the electrode body. The cut section in the longitudinal direction may be extended toward the electrode leading section beyond the cut section in the crossing direction, or the cut section in the crossing direction may be extended beyond the cut section in the longitudinal direction.

In the electricity storage device, preferably a torn part of the electrode body may be provided between the cut section in the longitudinal direction and the cut section in the crossing direction.

A method for manufacturing an electricity storage device that includes an electricity storage element formed by winding an electrode body of an anode or cathode side along with a separator comprises forming an electrode leading section having an inclined edge on an element end-face of the electricity storage element by a part of the electrode body.

In the method for manufacturing an electricity storage device, preferably the electrode leading section may be formed on an edge of the electrode body before or in the middle of winding to be the electricity storage element.

In the method for manufacturing an electricity storage device, preferably the method may comprise alternately forming a removal section and the electrode leading section on an edge of the electrode body before or in the middle of winding to be the electricity storage element. The removal section may be formed by a cut section in a longitudinal direction and a cut section in a crossing direction, the cut section in the longitudinal direction may be cut in the longitudinal direction of the electrode body, and the cut section in the crossing direction may be cut in the crossing direction of the electrode body. The cut section in the longitudinal direction may be extended toward the electrode leading section beyond the cut section in the crossing direction, or the cut section in the crossing direction may be extended beyond the cut section in the longitudinal direction.

In the method for manufacturing an electricity storage device, preferably the cut section in the longitudinal direction and the cut section in the crossing direction may be crossed.

In the method for manufacturing an electricity storage device, preferably an uncut part of the electrode body may be made to remain between the cut section in the longitudinal direction and the cut section in the crossing direction, and the removal section may be separated from the electrode body by tearing the uncut part.

In the method for manufacturing an electricity storage device, preferably the removal section and the electrode leading section may be formed within an unprocessed part of at least an oxide layer or a polarizable electrode layer of the electrode body.

According to aspects of the electricity storage device and the method for manufacturing the electricity storage device of the above embodiments, any of the following effects can be obtained.

(1) Because an electrode leading section has an inclining edge and is drawn obliquely to the center line of an electrode body in its longitudinal direction, it is rare to damage the electrode body, such as to crack the electrode body in response to stress on a leading section of an electrode leading section for the electrode body when an electricity storage element is wound and when the electricity storage element is shaped by bend, etc. after being wound, and form stability of an electrode leading section can be achieved.

(2) Stability of electric characteristics including capacitor characteristics, such as to reduce electric power loss and to keep conductivity can be achieved by an electricity storage device using an electricity storage element including the above described electrode leading section.

The preferred embodiments etc. of the present invention have been described as the above. The present invention is not limited to the above descriptions. Various variations and modifications can be made by those skilled in the art based on the spirit of the invention recited in Claims or disclosed in Description of Embodiments. Needless to say, such variations and modifications are encompassed in the scope of the present invention.

The electricity storage device and the method for manufacturing the same of the above embodiments can achieve stress distribution in winding and bending by forming inclining edges on electrode leading sections that are formed on electrode bodies of electricity storage element. It can be also achieved to limit generation of cracks and elongation of electrode bodies, and to stabilize the form of electrode leading sections. Thus, the electricity storage device and the method for manufacturing the same contribute to realization of electricity storage devices of high reliability.

What is claimed is:

1. An electricity storage device that includes an electricity storage element formed by winding an electrode body of an anode or cathode side along with a separator, wherein an electrode leading section having an inclined edge is formed on an element end-face of the electricity storage element by a part of the electrode body;
    wherein the electricity storage element alternately includes a removal section and the electrode leading section on an edge of the electrode body before or in the middle of winding, the removal section includes a cut section in a longitudinal direction and a cut section in a crossing direction, the cut section in the longitudinal direction being cut in
    the longitudinal direction of the electrode body, and the cut section in the crossing direction being cut in the crossing direction of the electrode body, and the cut section in the longitudinal direction is extended toward the electrode leading section beyond the cut section in the crossing direction, or the cut section in the crossing direction is extended beyond the cut section in the longitudinal direction.

2. The electricity storage device of claim 1, wherein
    the inclined edge has an inclination that is an angle oblique to a center line of the electrode body in a longitudinal direction.

3. The electricity storage device of claim 1, wherein
    the electrode leading section has a shape of a quadrangle including the inclined edge.

4. The electricity storage device of claim 1, wherein a torn part of the electrode body is provided between the cut section in the longitudinal direction and the cut section in the crossing direction.

5. A method for manufacturing an electricity storage device that includes an electricity storage element formed by winding an electrode body of an anode or cathode side along with a separator, the method comprising: forming an electrode leading section having an inclined edge on an element end-face of the electricity storage element by a part of the electrode body;
    alternately forming a removal section and the electrode leading section on an edge of the electrode body before or in the middle of winding to be the electricity storage element, wherein the removal section is formed by a cut section in a longitudinal direction and a cut section in a crossing direction, the cut section in the longitudinal direction being cut in the longitudinal direction of the electrode body, and the cut section in the crossing direction being cut in the crossing direction of the electrode body, and the cut section in the longitudinal direction is extended toward the electrode leading section beyond the cut section in the crossing direction, or the cut section in the crossing direction is extended beyond the cut section in the longitudinal direction.

6. The method of claim 5, wherein
    the electrode leading section is formed on an edge of the electrode body before or in the middle of winding to be the electricity storage element.

7. The method of claim 5, wherein the cut section in the longitudinal direction and the cut section in the crossing direction are crossed.

8. The method of claim 5, wherein
an uncut part of the electrode body is made to remain between the cut section in the longitudinal direction and the cut section in the crossing direction, and the removal section is separated from the electrode body by tearing the uncut part.

9. The method of claim 5, wherein
the removal section and the electrode leading section are formed within an unprocessed part of at least an oxide layer or a polarizable electrode layer of the electrode body.

\* \* \* \* \*